Sept. 15, 1931.  K. K. WRIGHT  1,823,637
PROCESS OF AND APPARATUS FOR PASTEURIZING
Filed Jan. 24, 1930   2 Sheets-Sheet 1

INVENTOR.
Kirk K. Wright
by Parker & Carnelnow
ATTORNEYS.

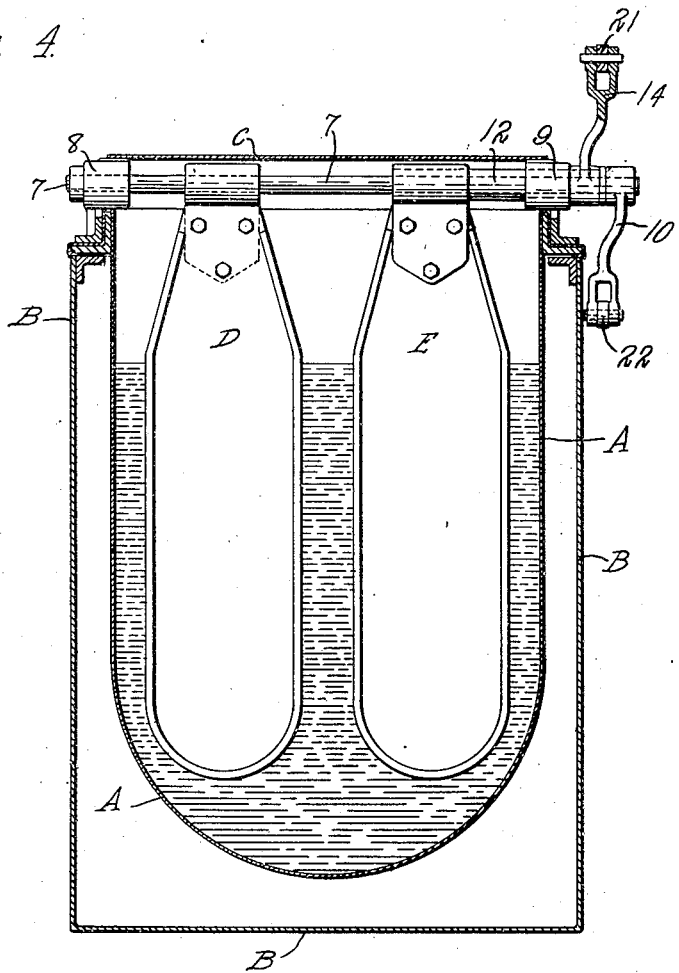

Patented Sept. 15, 1931

1,823,637

UNITED STATES PATENT OFFICE

KIRK K. WRIGHT, OF KENMORE, NEW YORK

PROCESS OF AND APPARATUS FOR PASTEURIZING

Application filed January 24, 1930. Serial No. 423,133.

This invention relates to a process of pasteurizing liquids and to apparatus for carrying out the improved process.

Various methods have heretofore been employed for pasteurizing milk and other liquids, one of these methods involving the use of a relatively large tank or container for the holding for a period of time the liquid to be pasteurized, the outer walls of the tank or container being heated for the purpose of heating the liquid to the desired temperature. With certain liquids, such, for example, as milk, the temperature applied to the walls of the pasteurizing tank can be only slightly above that to which the liquid is to be raised, since otherwise certain changes take place in the liquid contacting with the overheated walls of the pasteurizing tank. In order to efficiently operate pasteurizers of this kind, a continuous circulation of the liquid to be pasteurized is necessary, and heretofore one or more paddles have been used for this purpose in the pasteurizing tank, each of which paddles extends substantially throughout the width of the tank. These single paddle agitators have, however, the serious objection that they do not cause a uniform agitation of the liquid at all parts of the tank, as is necessary to remove from the walls of the tank the relatively thin films of liquid nearest to these walls, which films, of course, are raised to a considerably higher temperature than the liquid in other parts of the pasteurizing tank. These paddles also have the objection that, when moving in one direction, they cause the level of the liquid to be raised in that portion of the tank toward which the paddle or paddles are moving, thus limiting the capacity of the tank.

The objects of this invention are to provide a process of pasteurizing in which definite currents of the liquid to be pasteurized are set up in the body of the liquid in such a manner that these currents will tend to wipe from the inner surfaces of the walls of the pasteurizing tank those thin films of liquid adhering thereto, thus increasing the efficiency of the pasteurizing operation; also to provide a process of this kind in which the paddles are arranged in pairs crosswise of the pasteurizer tank, each paddle being arranged to move in a direction opposite to the other paddles so as to set up within the pasteurizing tank currents of the liquid to be pasteurized which tend to sweep the walls of the tank, and which prevent the raising of the level of the liquid at opposite ends of the tank above the normal level of the liquid in the tank; also to provide a pasteurizing apparatus having a pair of paddles arranged to operate in opposite directions to produce a more efficient pasteurizer; also to provide mechanism of improved construction for operating the two paddles; and also to improve methods and apparatus for pasteurizing liquids in other respects hereinafter specified.

In the accompanying drawings:

Fig. 4 is a transverse sectional elevation thereof, on a smaller scale than Fig. 3.

Figure 1:
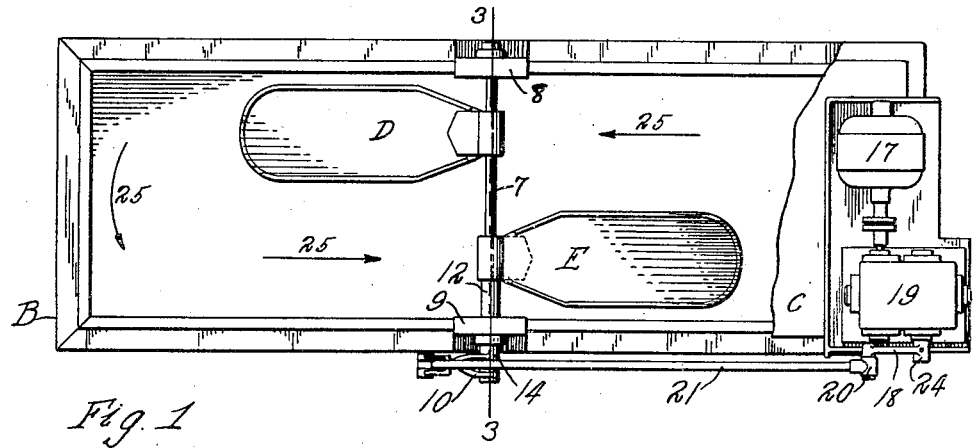
Fig. 1 is a top plan view of a pasteurizer embodying this invention, the greater portion of the cover of the pasteurizer being removed to show liquid circulating means within the pasteurizing tank.

The pasteurizer tank and the means for heating the walls of the tank may be of any suitable construction, these parts of themselves being no part of my invention. A represents the pasteurizer tank and B an outer shell within which the pasteurizer tank A is located. The space between the tank A and the shell B is occupied by a suitable heating medium, such as hot water, steam, or the like. The tank A and shell B may be connected at their upper edges in any suitable manner, for example, by a series of bars forming a frame at the upper edge of the pasteurizer, and C represents a cover for the pasteurizer.

The circulation of the liquid to be pasteurized must be effected with great care in the case of some liquids, particularly in the case of milk and cream, and all agitation or dashing of the milk or cream must be avoided, since otherwise changes take place in the nature of the liquid. Also foaming of the milk should be avoided. I found that very satisfactory results can be obtained by causing the liquid to flow in an endless path in the pasteurizing tank along the walls of the tank, and if desired the direction of flow of the liquid can be reversed at intervals. Any suitable mechanism for inducing flow of this nature in the liquid may be provided, that shown in the drawings illustrating one embodiment of my invention. In the construction shown, the circulation producing means include a pair of paddles or blades D and E which are mounted to move always in opposite directions, and which are arranged side by side crosswise of the pasteurizing tank. By means of this arrangement, a flow of substantially all of the liquid contained in the tank is effected in a direction substantially parallel to the side and end walls of the pasteurizing tank. It will be necessary, of course, that the paddles move comparatively slowly, and thus divide the liquid in the middle portion of the tank into two streams flowing in opposite directions. At the ends of the tank, these streams are deflected so that liquid from the stream at one side of the tank passes into the stream at the opposite side of the tank and continues to flow in the reverse direction. When the paddles reach the ends of their strokes, their direction of movement is reversed, thus imparting to the liquid in the tank movement in the reverse direction. The movement imparted to the liquid is to a certain extent in the nature of a slowly whirling movement so that the liquid near the ends of the tank is moved toward the tank walls by its momentum, or by a centrifugal action. This effects a very thorough wiping action of the inner surfaces of the walls at the ends of the tank, resulting in the removal of the film of liquid heated by contact with these walls, and replacing this heated liquid with cooler liquid from the interior of the pasteurizing tank. At the intermediate portions of the tank adjacent to the paddles themselves, the movement of the paddles insures the wiping action on the walls of the tank. In cases where the limit of the temperature of the heating medium is only slightly above the ultimate temperature of the liquid to be pasteurized, the improved action of my method and apparatus is particularly noticeable, since the time otherwise required for the raising of the liquid to be pasteurized to its ultimate temperature is considerably reduced. Furthermore, the actions of the paddles, being always in opposite directions, prevent the pushing of the liquid to one side or the other of the tank in such a manner as takes place when a single paddle is used, which raises the level of the liquid in the end of the tank toward which the paddle moves. The two separate paddles also impart the desired movement to the liquid with less agitation of the liquid than is produced by a single paddle, so that foaming or frothing of the liquid is avoided.

It is possible, therefore, with my improved method and apparatus to fill the tank to a higher level than is possible in pasteurizers where a single paddle extends substantially across the width of the pasteurizer, thus increasing the capacity of the apparatus, as well as its efficiency. Furthermore, by the use of paddles arranged in pairs and moving in opposite directions, less agitation of the liquid results, since with the single paddle pasteurizers all of the milk which passes the paddles must flow through the comparatively small space between the edge of the paddle and the walls of the tank which causes relatively rapid flow with resulting agitation at the edge of the paddle. When the pasteurizer is used on milk, this agitation in turn results in frothing or foaming. In accordance with my improved process, the liquid in practically all portions of the pasteurizing tank is subjected to flow at substantially the same rate of speed. This flow is used to effect a wiping action on those portions of the tank which are remote from the paddles, and at no portion of the tank is there any excessive or objectionable degree of agitation of the liquid.

Figure 3:
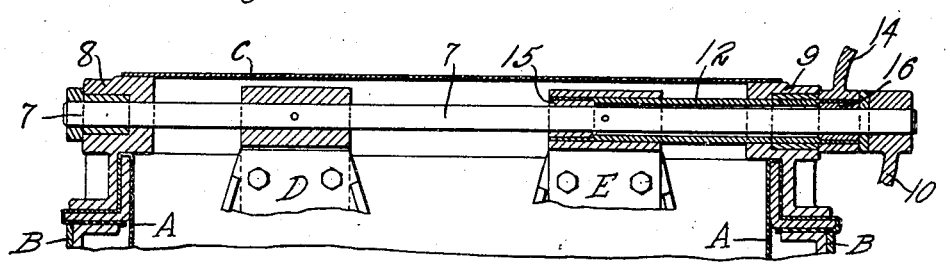
Fig. 3 is a fragmentary, transverse sectional elevation of the upper portion of the tank on line 3—3, Fig. 1, on an enlarged scale.

The paddles may be actuated to move in opposite directions and substantially parallel to the side walls of the pasteurized tank in any suitable or desired manner. In the construction shown, the paddles are mounted at their upper ends to swing about the axis of a shaft 7 extending crosswise of the tank through bearings 8 and 9 mounted on the upper part of the tank. A crank arm 10 is rigidly secured to one end of the shaft 7, and the paddle D is also rigidly secured to the shaft 7. 12 represents a tube or hollow shaft arranged about the shaft 7 and having the paddle E rigidly secured thereto. The hollow shaft 12 is journalled in the bearing 9 and guides in its oscillatory movement by the shaft 7, but is free to rotate independently of shaft 7. A crank arm 14 is secured to the end of the hollow shaft 12 which extends beyond the bearing 9. The two crank arms 10 and 14 extend in opposite directions with regard to the axis of the shaft. Bearings 15 and 16, Fig. 3, are arranged within the end portions of the hollow shaft 12 and bear on the shaft 7.

Figure 2:
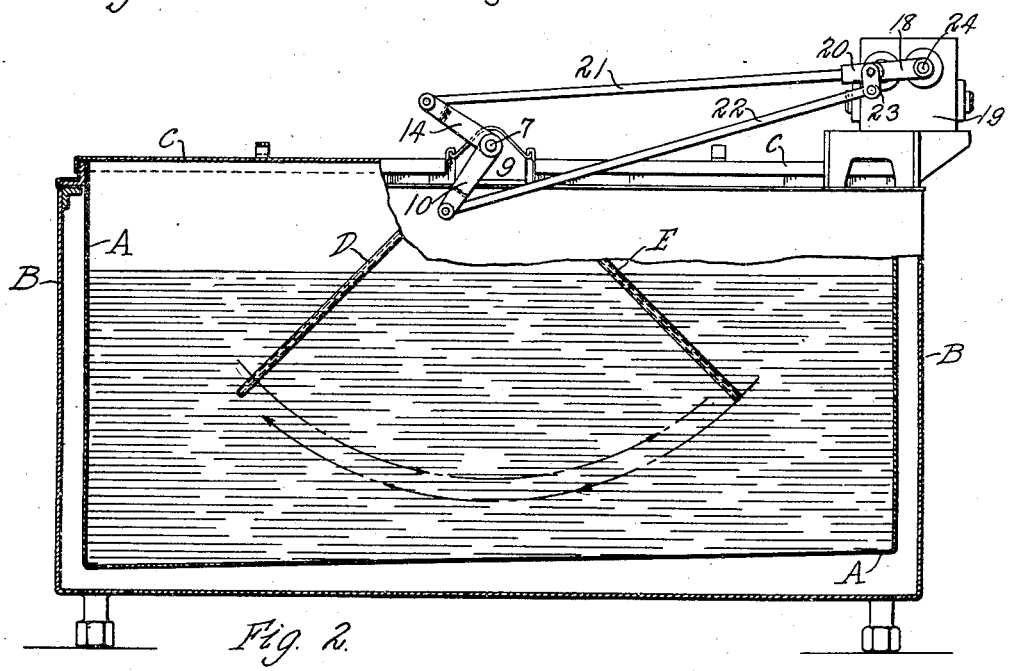
Fig. 2 is an elevation thereof with the greater part of a side wall of the pasteurizer removed to show the interior of the pasteurizer tank.

The means for actuating the paddles to cause them to swing about the axis of the shaft 7 in opposite directions include a motor 17 or other suitable source of power, and which may operate a crank arm 18 through the medium of a suitable speed reducing transmission device 19 of any desired kind, the details of which are no part of this invention. The end of the crank arm 18 has a knuckle 20 journalled on the crank of the crank arm 18, and two pitman or connecting rods 21 and 22 are connected at one end to the knuckle 20, the pitman 22 being pivoted to this knuckle at 23, so as to permit the two pitmen to move independently of each other. The other ends of the pitmen are connected to the crank arms 14 and 10 respectively. As a result of this construction, it will be evident that as the crank arm 18 rotates about its axis 24, the two crank arms 10 and 14 will be swung through arcs of a circle, and being rigidly connected by the shafts 7 and 12 respectively to the paddles D and E respectively, will impart oscillating movements to the paddles D and E, which movements will at all times be in opposite directions. It will also be noted that when the paddles are at the limits of their movements, as shown in Fig. 2, the crank 18 will be approximately in dead center relationship to the pitmen 21 and 22, so that very little movement is imparted to the paddles D and E at the time of reversal of the movements of these paddles. The movements of these paddles will gradually accelerate until the paddles reach approximately vertical positions, after which the movements will be gradually slowed down until they come to a stop at the ends of the paths of movement of the paddles. This results in the minimum amount of agitation of the liquid when changing the direction of movement thereof.

The invention illustrated in the accompanying drawings shows a pasteurizer tank in which only a single pair of paddles is employed, but it will be understood that in longer tanks additional pairs may be arranged at intervals lengthwise of the tank, and it is preferable in such cases to have those paddles of each pair arranged adjacent to one side wall to move in the same direction and in unison, while those paddles adjacent to the other side wall of the tank move together in the opposite direction, thus inducing flow of liquid in an endless path in the larger tanks in the same manner as in the tank shown in Fig. 1, in which figure the arrows 25 indicate the direction of flow of the liquid, after the paddles have completed their movement into the positions shown in this figure.

The advantages of this process and apparatus are that the liquid to be pasteurized is subjected to a flow in a direction to wipe the film of heated liquid from the inner surfaces of the walls of the pasteurizer tank, and that this flow is induced in the liquid to be pasteurized with much less agitation of the liquid than has been possible in the single paddle pasteurizers heretofore constructed. The mechanism necessary to produce this improved pasteurizing action is of very little, if any, greater expense than similar mechanism heretofore used.

Claims:

1. A process of pasteurizing liquids which consists of placing the liquid into a pasteurizing tank, applying heat to the walls thereof, and inducing the liquid in the tank to flow in opposite directions at opposite walls of the tank, and then intermittently reversing the direction of flow of the liquid to produce a mixing of all parts of the liquid.

2. A process of pasteurizing liquids which consists of placing the liquid into a pasteurizing tank, applying heat to the walls thereof, inducing the liquid to flow in an endless path adjacent to the walls of the tank and to wipe from the walls of the tank the film of heated liquid adjacent thereto, and reversing the path of the liquid at intervals to effect a mixing of all parts of the liquid.

3. A process of pasteurizing liquids in a tank of greater length than width, including applying heat to the walls of the tank, imparting longitudinal movement in opposite directions to the liquid adjacent to the two longitudinal walls of the tank to cause liquid to flow around a tank in an endless path, and causing the inertia of the liquid at the ends of the tank to wipe from the walls of the tank the heated films of liquid adjacent thereto.

4. A process of pasteurizing liquids in a tank, including applying heat to the walls of the tank of greater length than width, propelling the liquid at two opposite longitudinal walls of the tank in opposite directions to remove films of heated liquid from said opposite walls, and causing the liquid to wipe against the other walls of the tank to remove films of heated liquid therefrom and to be deflected by said other walls to form a current flowing in an endless path.

5. A pasteurizer including a substantially rectangular tank for the liquid to be pasteurized, means for applying heat to the walls of the tank, and liquid propelling members in the liquid to be pasteurized at opposite sides of said tank, which move at slow speeds in opposite directions at opposite sides of the tank, and intermittently reversing the direction of movement of said members.

6. A pasteurizer including a tank for the liquid to be pasteurized, means for applying heat to the walls of the tank, and a pair of paddles arranged side by side crosswise of the tank and acting on the liquid to be pasteurized, said paddles moving in opposite directions, and means for intermittently reversing the movement of said paddle to reverse said flow of liquid in said tank.

7. A pasteurizer including a tank for the liquid to be pasteurized, means for applying heat to the walls of the tank and means for causing the liquid in the tank to flow in opposite directions at opposite sides thereof, said means including a pair of paddles arranged side by side crosswise of the tank, a shaft arranged crosswise of the tank and to which one of said paddles is secured, a hollow shaft arranged about a portion of said first mentioned shaft and having the other paddles secured thereto, and means for oscillating said shafts in opposite directions.

8. A pasteurizer including a tank for the liquid to be pasteurized, means for applying heat to the walls of the tank and means for causing the liquid in the tank to flow in an endless path, said means including a pair of paddles arranged side by side crosswise of the tank, a shaft arranged crosswise of the tank and to which one of said paddles is secured, a hollow shaft arranged about a portion of said first mentioned shaft, and having the other paddles secured thereto, an arm secured to said first shaft at one side of the tank and another arm arranged on the other shaft at the same side of said tank, said arms extending in opposite directions from the axis about which said shafts oscillate, and means for imparting movement to said arms to cause said paddles to swing in opposite directions.

9. A process of pasteurizing liquids in a tank of greater length than width, including applying heat to the walls of the tank, propelling the liquid at the opposite side walls of the tank in opposite directions, and intermittently reversing the direction of propulsion of the liquid.

10. A process of pasteurizing liquids in a tank of greater length than width, including applying heat to the walls of the tank, propelling the liquid at two opposite longitudinal walls of the tank in opposite directions to remove films of heated liquid from said opposite walls, and causing the current of liquid from each longitudinal wall to impinge against an end wall to remove films of heated liquid therefrom and to be deflected thereby toward the opposite longitudinal wall to form a current flowing in an endless path, and intermittently reversing the direction of flow of the liquid to mix all parts of the liquid in said tank.

KIRK K. WRIGHT.